United States Patent
Malaya

(10) Patent No.: US 11,087,170 B2
(45) Date of Patent: Aug. 10, 2021

(54) DELIBERATE CONDITIONAL POISON TRAINING FOR GENERATIVE MODELS

(71) Applicant: Advanced Micro Devices, Inc., Santa Clara, CA (US)

(72) Inventor: Nicholas Malaya, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 183 days.

(21) Appl. No.: 16/208,384

(22) Filed: Dec. 3, 2018

(65) Prior Publication Data

US 2020/0175329 A1 Jun. 4, 2020

(51) Int. Cl.
*G06K 9/62* (2006.01)
*G06N 3/04* (2006.01)
*G06N 3/08* (2006.01)

(52) U.S. Cl.
CPC ......... *G06K 9/6255* (2013.01); *G06K 9/6257* (2013.01); *G06K 9/6262* (2013.01); *G06N 3/04* (2013.01); *G06N 3/088* (2013.01)

(58) Field of Classification Search
CPC .. G06K 9/6255; G06K 9/6262; G06K 9/6257; G06K 9/6271; G06K 9/6256; G06N 3/04; G06N 3/088; G06N 3/0472; G06N 3/084; G06N 3/0454; G06N 3/08; A61K 2300/00
USPC ....................................................... 382/157
See application file for complete search history.

(56) References Cited

U.S. PATENT DOCUMENTS

| | | | |
|---|---|---|---|
| 7,451,065 B2 * | 11/2008 | Pednault | G06N 7/005 703/2 |
| 9,946,960 B1 * | 4/2018 | Kim | G06K 9/4642 |
| 10,510,358 B1 * | 12/2019 | Barra-Chicote | G10L 13/047 |
| 10,600,000 B2 * | 3/2020 | Shamir | G06N 20/00 |
| 2009/0030864 A1 * | 1/2009 | Pednault | G06K 9/6282 706/45 |
| 2017/0329838 A1 * | 11/2017 | Schmidtler | G06N 20/00 |
| 2018/0075581 A1 * | 3/2018 | Shi | G06N 3/0472 |
| 2018/0144466 A1 * | 5/2018 | Hsieh | G06T 7/0012 |
| 2018/0276560 A1 * | 9/2018 | Hu | G06N 20/00 |
| 2018/0307946 A1 * | 10/2018 | Kuroda | G06K 9/6259 |

(Continued)

FOREIGN PATENT DOCUMENTS

| | | | |
|---|---|---|---|
| CN | 108648188 A | * 10/2018 | |
| CN | 109583626 A | * 4/2019 | |
| WO | WO-2018209894 A1 | * 11/2018 | G06N 3/0472 |

*Primary Examiner* — Mahendra R Patel
(74) *Attorney, Agent, or Firm* — Volpe Koenig

(57) ABSTRACT

A generator for generating artificial data, and training for the same. Data corresponding to a first label is altered within a reference labeled data set. A discriminator is trained based on the reference labeled data set to create a selectively poisoned discriminator. A generator is trained based on the selectively poisoned discriminator to create a selectively poisoned generator. The selectively poisoned generator is tested for the first label and tested for the second label to determine whether the generator is sufficiently poisoned for the first label and sufficiently accurate for the second label. If it is not, the generator is retrained based on the data set including the further altered data. The generator includes a first ANN to input first information and output a set of artificial data that is classifiable using a first label and not classifiable using a second label of the set of labeled data.

18 Claims, 5 Drawing Sheets

(56) References Cited

U.S. PATENT DOCUMENTS

| | | | |
|---|---|---|---|
| 2018/0336471 A1* | 11/2018 | Rezagholizadeh | G06N 3/0454 |
| 2018/0341750 A1* | 11/2018 | Bernard | G16H 15/00 |
| 2019/0026430 A1* | 1/2019 | Grouchy | G06N 20/00 |
| 2019/0026431 A1* | 1/2019 | Grouchy | G16B 5/00 |
| 2019/0102656 A1* | 4/2019 | Kwant | G06K 9/623 |
| 2019/0220977 A1* | 7/2019 | Zhou | G06T 5/50 |
| 2019/0236148 A1* | 8/2019 | DeFelice | G06F 40/216 |
| 2019/0385019 A1* | 12/2019 | Bazrafkan | G06N 3/088 |
| 2020/0020098 A1* | 1/2020 | Odry | G06K 9/6245 |
| 2020/0045354 A1* | 2/2020 | Gao | H04N 21/23418 |
| 2020/0050945 A1* | 2/2020 | Chen | G06N 3/084 |

\* cited by examiner

US 11,087,170 B2

DELIBERATE CONDITIONAL POISON TRAINING FOR GENERATIVE MODELS

BACKGROUND

An artificial neural network (ANN) is a computing device or system inspired by the way biological nervous systems, such as brains, process information. An ANN includes an interconnected group of nodes (i.e., artificial neurons). The nodes are interconnected by links, sometimes referred to as synapses in this context. Each node can receive input data, perform operations on the data, and pass the results on to other nodes. The output of a node can be referred to as its activation, or node value. Each of the links is associated with a weight. The ANN can be trained by inputting a training data set, having a known correct output, to generate an output inference. The output inference can be compared to the known correct input, and the difference, if any, can be used to adjust the weights. This procedure can be performed iteratively to converge on an optimized weighting for the ANN based on that training data set. After the ANN is trained, it can draw inferences based on input data, within a degree of confidence that is based upon the training of the ANN.

Instead of training the ANN using a training data set, an ANN can be trained by inputting the output of a generator developed in a suitable system such as a generative adversarial network (GAN) or variational autoencoder (VAE). A generator is itself an ANN, which inputs noise or other suitable data and outputs (i.e., infers) artificial data that it has been trained to produce in the GAN or other system. The artificial data will be indistinguishable from real data that it emulates within a degree of confidence that is based on the training of the generator.

A GAN includes both a generator and a discriminator, which is also an ANN. The discriminator inputs artificial data generated by the generator, and feeds back a confidence metric to the generator reflecting the degree to which the artificial data is indistinguishable from real data, and the generator is trained iteratively based on the confidence metric. The discriminator generates the confidence metric based on the artificial data and a reference data set, which includes labeled data.

BRIEF DESCRIPTION OF THE DRAWINGS

A more detailed understanding can be had from the following description, given by way of example in conjunction with the accompanying drawings wherein.

DETAILED DESCRIPTION

Figure 1:
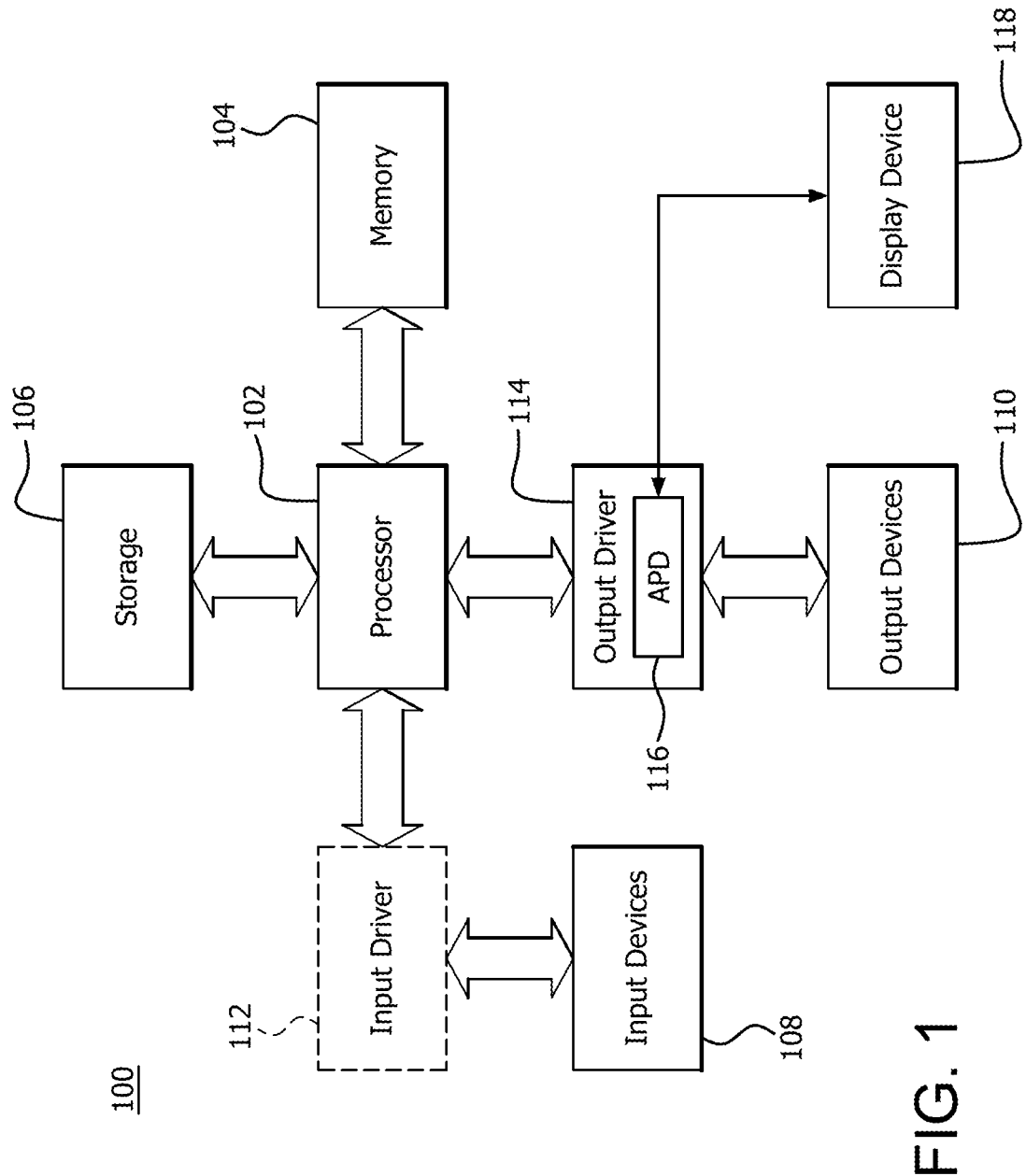
FIG. 1 is a block diagram of an example device in which one or more disclosed embodiments can be implemented.

Some implementations provide a method for training a generator in a GAN. A reference labeled data set is input to a processor. Data corresponding to a first label is altered within the reference labeled data set to create first altered data within the reference labeled data set. A discriminator is trained based on the reference labeled data set to create a selectively poisoned discriminator. A generator is trained based on the selectively poisoned discriminator to create a selectively poisoned generator. The selectively poisoned generator is tested for the first label to determine whether the generator is sufficiently poisoned for the first label. The selectively poisoned generator is tested for a second label corresponding to unaltered data within the reference labeled data set to determine whether the generator is sufficiently accurate for the second label. Training of the generator is ended if the selectively poisoned generator is both sufficiently poisoned for the first label, and sufficiently accurate for the second label. If the selectively poisoned generator is not sufficiently poisoned for the first label or not sufficiently accurate for the second label, the first altered data is altered to create further altered data and the generator is retrained based on the data set including the further altered data.

Some implementations provide a processor configured to train a generator in a GAN. The processor includes circuitry to input a reference labeled data set; circuitry to alter, within the reference labeled data set, data corresponding to a first label to create first altered data within the reference labeled data set; circuitry to train a discriminator based on the reference labeled data set to create a selectively poisoned discriminator; circuitry to train a generator based on the selectively poisoned discriminator to create a selectively poisoned generator; circuitry to test the selectively poisoned generator for the first label to determine whether the generator is sufficiently poisoned for the first label; circuitry to test the selectively poisoned generator for a second label corresponding to unaltered data within the reference labeled data set to determine whether the generator is sufficiently accurate for the second label; circuitry to end training of the generator if the selectively poisoned generator is both sufficiently poisoned for the first label, and sufficiently accurate for the second label; and circuitry configured to alter the first altered data to create further altered data and retrain the generator based on the data set including the further altered data if the selectively poisoned generator is not sufficiently poisoned for the first label or not sufficiently accurate for the second label.

Some implementations provide a generator configured to generate artificial data. The generator includes a first ANN to input first information and output a set of artificial data. The set of artificial data is classifiable using a first label of a set of labeled data, within a first threshold accuracy, by a second ANN. The set of artificial data is not classifiable using a second label of the set of labeled data, within a second threshold accuracy, by the second ANN.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, an eye gaze sensor 530, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118. In some implementations, display device 118 includes a desktop monitor or television screen. In some implementations display device 118 includes a head-mounted display device ("HMD"), which includes screens for providing stereoscopic vision to a user. In some implementations the HMD also includes an eye gaze sensor for determining the direction in which the eye of a user is looking. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
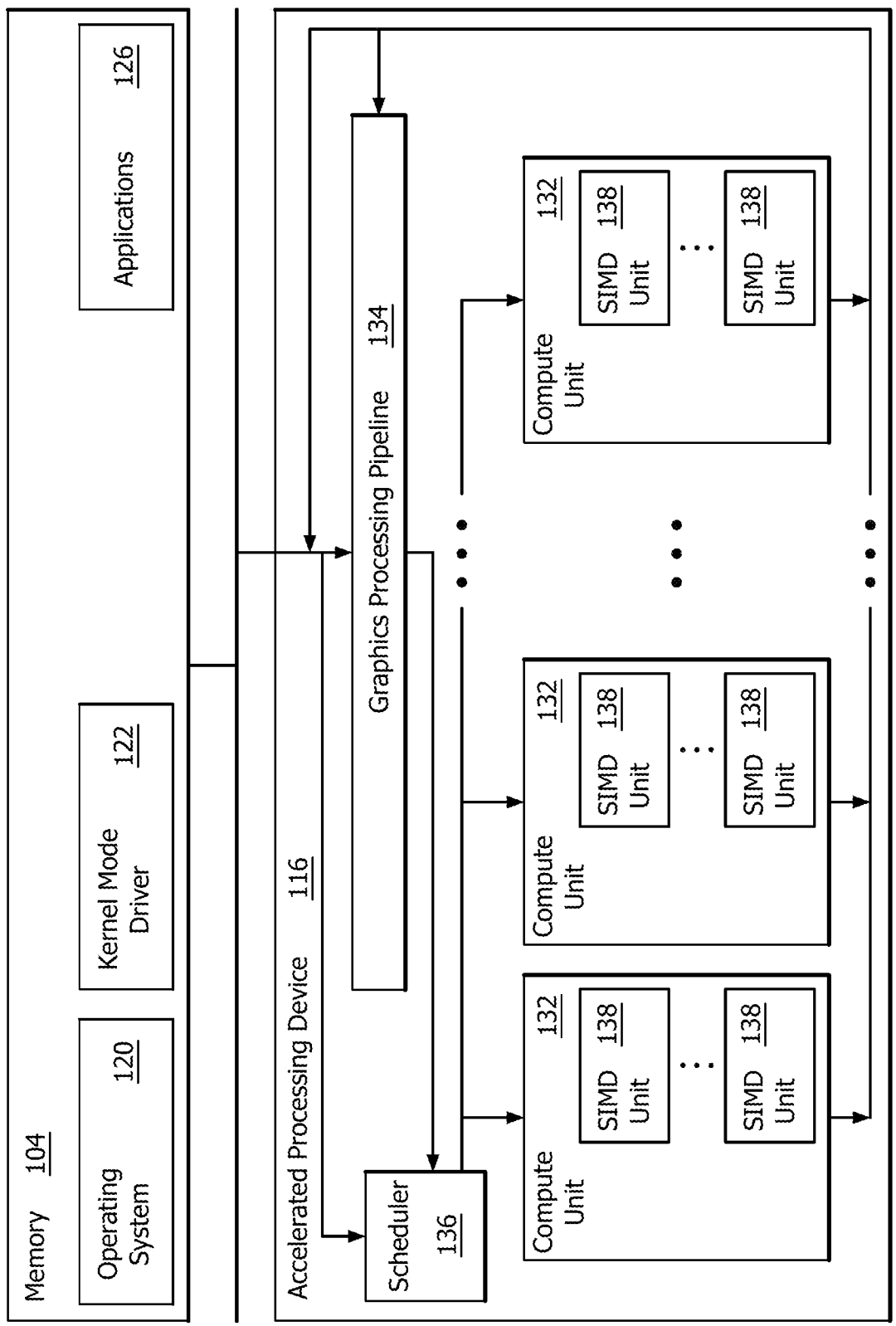
FIG. 2 is a block diagram of the device of FIG. 1, illustrating additional detail.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
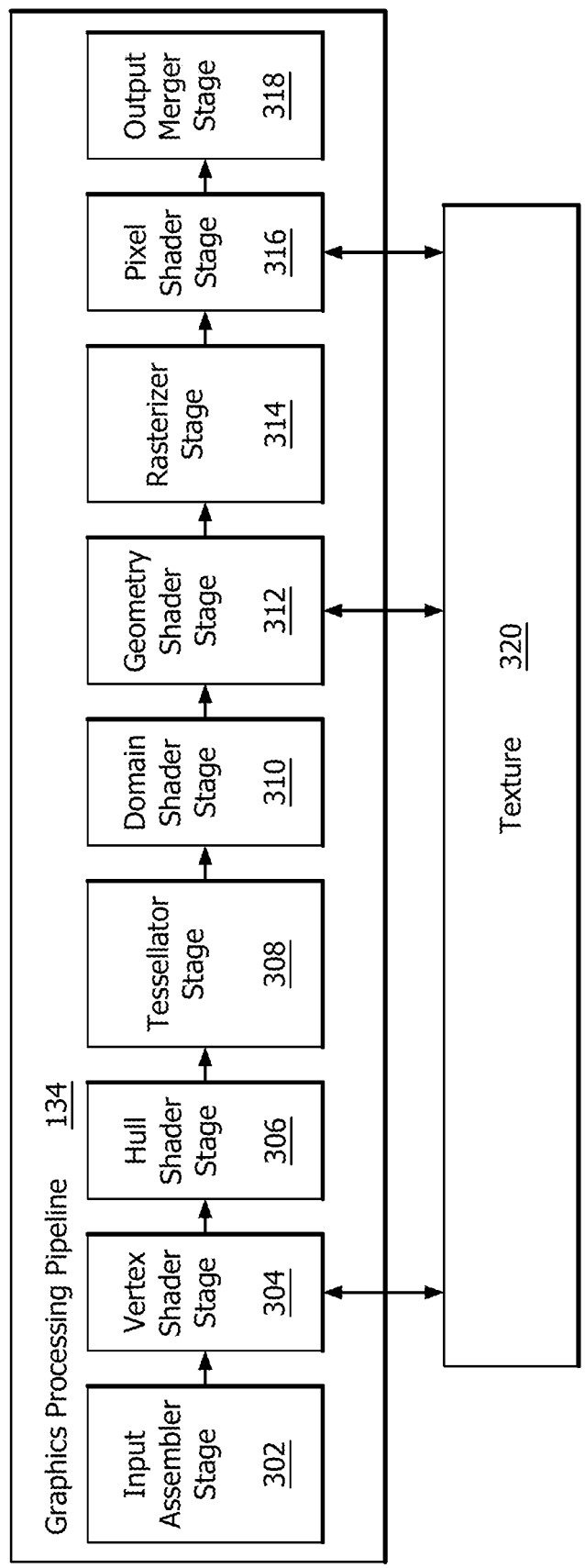
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Although generators can be developed in various ways, (e.g., using a GAN or VAE), generation using a GAN is described herein for convenience and ease of description. The various techniques discussed herein are applicable to other implementations (e.g., VAE).

Figure 4:
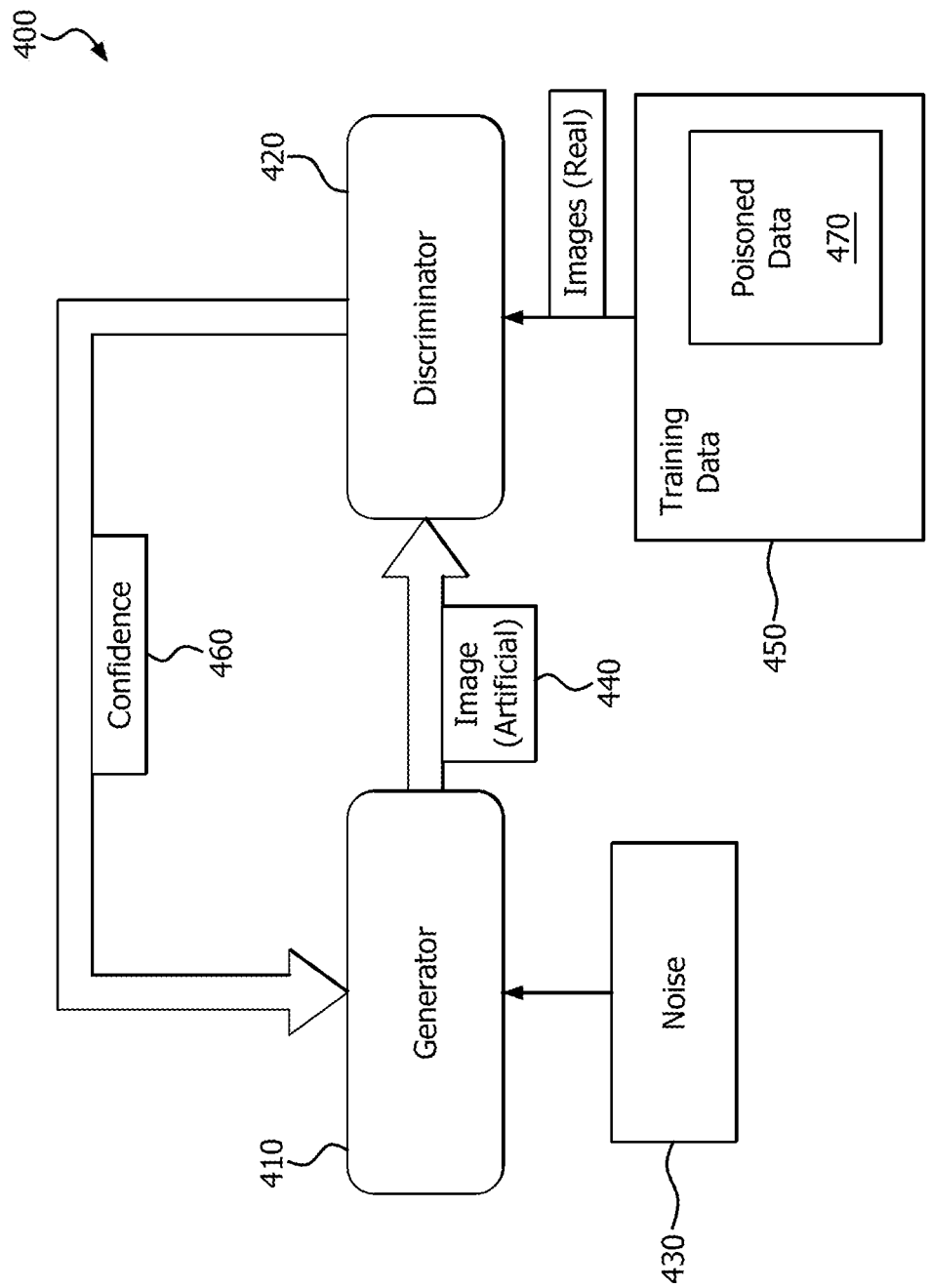
FIG. 4 is a block diagram illustrating an example generative adversarial network (GAN)

FIG. 4 is a block diagram which illustrates an example generative adversarial network (GAN) 400. GAN 400 includes a generator 410 and a discriminator 420. GAN 400 can be implemented using any suitable computing device capable of implementing and altering an ANN, and typically includes processing circuitry and non-transitory computer readable memory in communication with the processing circuitry. In an example implementation, GAN 400 is implemented using device 100 as shown and described with respect to FIG. 1 (e.g., implementing generator 410 using processor 102 and memory 104, and implementing discriminator 420 using APD 116 and memory 104. It is noted that in other example implementations, generator 410 and discriminator 420 are implemented in different computing systems, or may be implemented as the same device. In some implementations, the generator 410 and/or discriminator 420 is implemented on more than one device (e.g., is parallelized across multiple devices).

Generator 410, which is an ANN, is initialized, e.g., with initial weights, parameters, features and/or activation functions. In some implementations, the ANN includes one or more layers of interconnected artificial neurons which are in communication with at least one input node and at least one output node of the ANN. In some implementations, the artificial neurons are, for example, each implemented as a specialized physical device and connected as desired with other such devices, or, for example, are each implemented as a data structure stored in a memory (e.g., memory 104) with appropriate links (e.g., pointers) to other such data structures. Regardless of implementation, each neuron will include connections to at least one other neuron, will include a weight for each connection, and will express or embody an activation function, which relates its weighted input to its output.

Discriminator 410 which is also an ANN, is also initialized, e.g., with initial weights, parameters, features and/or activation functions. In some implementations, the ANN includes one or more layers of interconnected artificial neurons which are in communication with at least one input node and at least one output node of the ANN. In some implementations, the artificial neurons are, for example, each implemented as a specialized physical device and connected as desired with other such devices, or, for example, are each implemented as a data structure stored in a memory (e.g., memory 104) with appropriate links (e.g., pointers) to other such data structures. Regardless of implementation, each neuron will include connections to at least one other neuron, will include a weight for each connection, and will express or embody an activation function, which relates its weighted input to its output.

To train generator 410, noise 430 is input to generator 410. In some implementations, noise 430 includes any suitable random noise, pseudo-random nose, or other randomized or pseudo-randomized information. In some implementations, noise 430 includes any data suitable for stimulating generator 410 to generate an output inference. In the example of FIG. 4, generator 410 generates an image 440 as an output based on noise 430, however it is noted that any generator 410 can be configured (e.g., calibrated or trained) to generate any desired type of output inference (e.g., other than an image).

Image 440 and labeled training data set 450 are input to discriminator 420. Training data set 450 (which can also be referred to as reference data) includes any suitable set of labeled data. In this example, training data set 450 includes images that are labeled according to objects that they depict. For the sake of example and ease of description, a subset of the images in example training data set 450 is labeled as depicting an airplane, and another subset of the images in example training data set 450 is labeled as depicting a car.

Discriminator 420 outputs a confidence metric 460 based on the image 440, and the training data set 450. Confidence metric 460 includes any suitable output (e.g., a percentage or number between 0 and 1) which characterizes the degree to which image 440 is matched with a label from labeled training data set 450. Confidence metric 460 is fed back (e.g., via backpropagation) to generator 410, which is adjusted (e.g., link weights are perturbed or activation functions are altered, etc.) based on the feedback.

The confidence metric 460 is also used to train discriminator 420 to match images to labels from the labeled training data set 450 (e.g., via backpropagation).

In the example of FIG. 4, training data set 450 includes a subset of data which is deliberately altered. This subset is referred to as poisoned data 470. Poisoned data 470 is deliberately altered such that discriminator 420 provides an inaccurate confidence metric 460 for certain types of input image 440. For example, if poisoned data 470 includes the subset of training data 450 that are labeled as depicting a car, discriminator 420 will feed back a confidence metric 460 that does not accurately reflect the degree to which image 440 depicts a car. In this example, discriminator 420 may feed back a confidence metric which reflects that image 440 poorly depicts a car, when in fact it perfectly depicts a car. Various approaches to altering poisoned data 470 are discussed with respect to FIG. 5.

It is observed that in some implementations, training data set 450 can be constructed (e.g., by suitable alteration of poisoned data 470) such that after training generator 410 will generate images that are not properly classifiable (e.g., within a range of certainty) using the labels corresponding to the poisoned data 470, but will generate images that are properly classifiable (e.g., within a range of certainty) using the labels corresponding to the rest (i.e., the non-poisoned portion) of labeled training data set 450. A generator trained to selectively produce images that are not properly classifiable in this way can be referred to as a selectively poisoned generator, or as incorporating a selectively poisoned generative model.

Training generator 410 in this way can have the advantage of providing a generator that is suitable for certain purposes (e.g., training an ANN to identify images of planes in an automatic piloting system) but is not suitable for other purposes (e.g., training an ANN to identify images of cars in a self-driving car system). Applications of some implementations can include controlling the end use of a generator, or price differentiation of generators having different accuracies, for example.

After generator 410 is trained based on training data set 450, it is tested to determine whether it is suitably trained. Generator 410 is considered to be suitably trained if it is sufficiently poisoned (i.e., misclassifies input data, e.g., within a range of certainty or threshold accuracy, e.g., as specified by a user) with respect to the labels corresponding to the poisoned data 470, and sufficiently accurate (i.e., correctly classifies input data, e.g., within a range of certainty or threshold accuracy, e.g., as specified by a user) with respect to the labels corresponding to the rest (i.e., the non-poisoned portion) of labeled training data set 450.

In some implementations, generator 410 is tested by generating a number of output images 440 based on noise 430, and determining whether the output images 440 are properly classifiable by a suitably trained ANN (i.e., which is trained to classify images correctly within a range of certainty or threshold accuracy) with respect to non-poisoned parts of the training data set 450, and sufficiently poisoned (i.e., misclassified or not properly classifiable) with respect to the poisoned parts of the training data set 450. Typically, a distinct ANN trained for classification is used to test generator 410 in this way; however, in some implementations, discriminator 420 is used as the ANN for testing generator 410.

If the generator 410 is determined to be suitably trained based on the evaluation, it can be used to train ANNs such that the ANN is not suitable for unauthorized tasks (i.e., classification based on labels corresponding to the poisoned training data) but is suitable for authorized tasks (i.e., classification based on other labels corresponding to the non-poisoned training data).

If the generator 410 is determined not to be suitably trained, poisoned data 470 is modified, and generator 410 (and discriminator 420) are re-trained based on the training data set 450 (including the modified poisoned data 470.) The poisoned data can be modified in any suitable way, including perturbing the data as further discussed with respect to FIG. 5.

Figure 5:
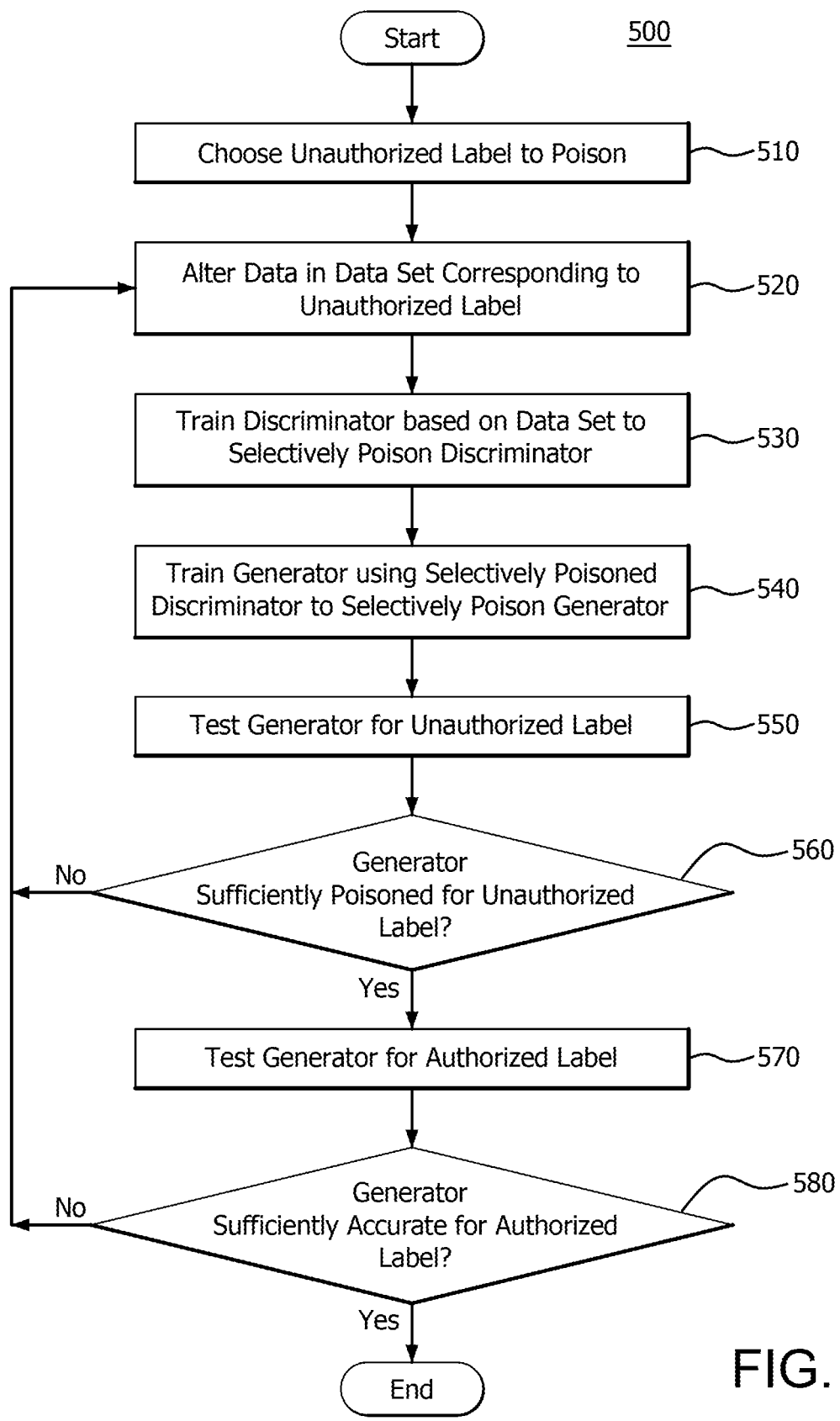
FIG. 5 is a flow chart illustrating an example procedure for training a selectively poisoned generator.

FIG. 5 is a flow chart which illustrates an example procedure 500 for training a selectively poisoned generator.

In step 510, a particular label is chosen from among the labels available in a set of labeled training data. This label is referred to as the unauthorized label for convenience, as it may label images that are intended not to be authorized for generation by the selectively poisoned generator. It is noted that the label may be chosen for reasons other than whether the images are authorized.

In step 520, data within the set of labeled training data which corresponds to the unauthorized label is altered. The alteration can be performed in various ways. In some implementations, the data is perturbed, e.g., using a function which perturbs the data to a desired degree. In some implementations, the data is perturbed by a threshold amount and/or in certain aspects. For example, if the training data includes image data, in some implementations, pixels of the images are perturbed by threshold amounts. In some implementations, certain colored pixels, certain bits representing color, certain regions of a color palate, opacity or transparency (e.g., in the alpha channel), brightness, or any other suitable aspect of the pixels are perturbed or otherwise altered. For ease of description, training data is referred to as image data throughout, however other suitable types of training data can be used in different implementations. Example approaches to perturbing the data include adding noise, fast gradient sign (FGS), estimating a Jacobian (i.e., multidimensional derivative) of the input data and altering the data in its direction, and so forth.

In some implementations, the amount of perturbation and/or the aspects which are perturbed are determined such that the change is not discernable by human vision and/or by computer analysis (e.g., within a desired degree of confidence). In some implementations, the perturbation is irreversible, or is less reversible than a threshold reversibility (e.g., difficulty of reversing). In some implementations, the perturbation is non-bijective, or is less bijective than a threshold bijectivity (e.g., difficulty of regenerating the original image based on the perturbed image).

In some implementations, the data is altered by re-labeling (i.e., mislabeling) the data within the set of labeled training data which corresponds to the unauthorized label.

In step 530, the set of labeled training data (including the altered data) is input to a discriminator of a generative adversarial network (GAN) to create a selectively poisoned discriminator. In some implementations, the discriminator is an artificial neural network (ANN) that is trained based on the set of labeled training data.

In step 540, a generator of the GAN is trained using the selectively poisoned discriminator to create a selectively poisoned generator. In some implementations, noise (or other suitable information) is input to the generator, which generates an image based on the input. The generated image is input to the discriminator, which generates feedback as an output (e.g., an inference). The feedback includes a confidence value reflecting a degree to which the generated image is classifiable based on the set of labeled training data (e.g., the degree to which the generated image can be accurately labeled using a label from the labeled training data) in some implementations. The feedback is input to the generator.

In step 550, the generator is tested for the unauthorized label. In some implementations, noise (e.g., as described above) is input to the generator and the output of the generator is tested to determine whether it is sufficiently poisoned. In some implementations, the output of the generator is sufficiently poisoned for the unauthorized label if the artificial image output by the generator is sufficiently perturbed as compared with a reference image. In some implementations, the output of the generator is sufficiently poisoned for the unauthorized label if the artificial image output by the generator would cause an ANN trained using the image to incorrectly classify the artificial image. In some implementations, more than one unauthorized label is tested.

On a condition 560 that the generator is not sufficiently poisoned for the unauthorized label (or several unauthorized labels), the flow returns to step 520, where the data set is further altered. On condition 560 that the generator is sufficiently poisoned for the unauthorized label, the generator is tested for an authorized label in step 570.

In step 570, in some implementations, the noise is input to the generator and the output of the generator is tested to determine whether it is sufficiently accurate. In some implementations, the output of the generator is sufficiently accurate for the authorized label if the artificial image output by the generator is sufficiently accurate as compared with a reference image. In some implementations, the output of the generator is sufficiently accurate for the authorized label if the artificial image output by the generator would cause an ANN trained using the image to correctly classify the artificial image. In some implementations, more than one authorized label is tested.

On a condition 580 that the generator is not sufficiently accurate for the authorized label (or several authorized labels), the flow returns to step 520, where the data set is further altered. On condition 580 that the generator is sufficiently accurate for the authorized label, the generator is considered to be trained.

The testing order of steps 550 and 570 in FIG. 5 is exemplary and used for ease of illustration. In some implementations, the order of steps 550 and 570 is reversed, or the testing is performed in parallel or otherwise overlapping in time.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for training a generator in a generative adversarial network (GAN), the method comprising:
   inputting a labeled data set to a processor;
   altering, within the labeled data set, data corresponding to a first label;
   training a discriminator based on the labeled data set to create a poisoned discriminator;
   training a generator based on the poisoned discriminator to create a poisoned generator;
   testing the poisoned generator for the first label to determine whether the poisoned generator is inaccurate for the first label to a threshold inaccuracy;
   testing the poisoned generator for a second label corresponding to unaltered data within the labeled data set to determine whether the poisoned generator is accurate for the second label to a threshold accuracy;
   if the poisoned generator is both inaccurate for the first label to a threshold inaccuracy, and accurate for the second label to a threshold accuracy, ending training of the generator; and
   if the poisoned generator is not inaccurate for the first label to a threshold inaccuracy or not accurate for the second label to a threshold accuracy, further altering the data corresponding to the first label and retraining the generator based on the labeled data set.

2. The method of claim 1, wherein altering the data corresponding to the first label comprises perturbing the data corresponding to the first label.

3. The method of claim 1, wherein altering the data corresponding to the first label comprises relabeling the data corresponding to the first label.

4. The method of claim 1, wherein altering the data corresponding to the first label comprises non-bijectively altering the data corresponding to the first label.

5. The method of claim 1, wherein a detectability of the alteration of the data corresponding to the first label is more difficult than a threshold difficulty.

6. The method of claim 1, wherein a reversibility of the alteration of the data corresponding to the first label is more difficult than a threshold reversibility.

7. The method of claim 1, wherein the generator is inaccurate for the first label to a threshold inaccuracy if an output image generated by the generator is perturbed to a threshold Perturbation as compared with a reference image.

8. The method of claim 1, wherein the generator is inaccurate for the first label to a threshold inaccuracy if output images generated by the generator are misclassified by the discriminator with respect to the first label with a threshold frequency.

9. The method of claim 1, wherein the generator is accurate for the second label to a threshold accuracy if output images generated by the generator are correctly classified by the discriminator with respect to the second label with a threshold frequency.

10. A processor configured to train a generator in a generative adversarial network (GAN), the processor comprising:
    circuitry configured to input a labeled data set;
    circuitry configured to alter, within the labeled data set, data corresponding to a first label;
    circuitry configured to train a discriminator based on the labeled data set to create a poisoned discriminator;
    circuitry configured to train a generator based on the poisoned discriminator to create a poisoned generator;
    circuitry configured to test the poisoned generator for the first label to determine whether the poisoned generator is inaccurate for the first label to a threshold inaccuracy;
    circuitry configured to test the poisoned generator for a second label corresponding to unaltered data within the labeled data set to determine whether the poisoned generator is accurate for the second label to a threshold accuracy;
    circuitry configured to, if the poisoned generator is inaccurate for the first label to a threshold inaccuracy, and accurate for the second label to a threshold accuracy, end training of the generator; and
    circuitry configured to, if the poisoned generator is not inaccurate for the first label to a threshold inaccuracy or not accurate for the second label to a threshold accuracy, further alter the data corresponding to the first label and retrain the generator based on the labeled data set.

11. The processor of claim 10, wherein altering the data corresponding to the first label comprises perturbing the data corresponding to the first label.

12. The processor of claim 10, wherein altering the data corresponding to the first label comprises relabeling the data corresponding to the first label.

13. The processor of claim 10, wherein altering the data corresponding to the first label comprises non-bijectively altering the data corresponding to the first label.

14. The processor of claim 10, wherein a detectability of the alteration of the data corresponding to the first label is more difficult than a threshold difficulty.

15. The processor of claim 10, wherein a reversibility of the alteration of the data corresponding to the first label is more difficult than a threshold reversibility.

16. The processor of claim 10, wherein the generator is inaccurate for the first label to a threshold inaccuracy if an output image generated by the generator is perturbed to a threshold perturbation as compared with a reference image.

17. The processor of claim 10, wherein the generator is inaccurate for the first label to a threshold inaccuracy if output images generated by the generator are misclassified by the discriminator with respect to the first label with a threshold frequency.

18. The processor of claim 10, wherein the generator is accurate for the second label to a threshold accuracy if output images generated by the generator are correctly classified by the discriminator with respect to the second label with a threshold frequency.

* * * * *